United States Patent
Maman et al.

(10) Patent No.: US 12,513,219 B1
(45) Date of Patent: Dec. 30, 2025

(54) MANAGING COMMUNICATION WITH ENDPOINT DEVICES IN AN EDGE ENVIRONMENT

(71) Applicant: Dell Products L.P., Round Rock, TX (US)

(72) Inventors: Nechami Maman, Jerusalem (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 77 days.

(21) Appl. No.: 18/756,184

(22) Filed: Jun. 27, 2024

(51) Int. Cl.
*H04L 67/51* (2022.01)
*H04L 9/08* (2006.01)
*H04L 9/32* (2006.01)

(52) U.S. Cl.
CPC ............ *H04L 67/51* (2022.05); *H04L 9/0825* (2013.01); *H04L 9/3247* (2013.01)

(58) Field of Classification Search
CPC ...... H04L 67/51; H04L 9/0825; H04L 9/3247
See application file for complete search history.

(56) References Cited

U.S. PATENT DOCUMENTS

| 2005/0229183 | A1* | 10/2005 | Araujo | G06F 13/24 719/310 |
| 2013/0298242 | A1* | 11/2013 | Kumar | H04L 63/0209 726/25 |
| 2022/0312304 | A1* | 9/2022 | Lee | H04W 24/10 |
| 2024/0231961 | A1* | 7/2024 | Thomas | G06F 9/542 |

* cited by examiner

*Primary Examiner* — Benjamin M Thieu
(74) *Attorney, Agent, or Firm* — WOMBLE BOND DICKINSON (US) LLP

(57) ABSTRACT

Methods and systems for managing communication with endpoint devices in a deployment are disclosed. The method may include establishing a limited communication channel between an endpoint device of the endpoint devices and an orchestrator to prevent the endpoint device from directly communicating and event consumer. The method may also include providing, by the orchestrator and to the endpoint device, an event schema that defines formatting for event data generated by the endpoint device. When event data is obtained by the orchestrator from the endpoint device, the orchestrator may identify whether the event data is reliable based on a digital signature provided with the event data from the endpoint device. If the event data is identified to be reliable, the event data may be provided to any number of event consumers.

20 Claims, 5 Drawing Sheets

MANAGING COMMUNICATION WITH ENDPOINT DEVICES IN AN EDGE ENVIRONMENT

FIELD

Embodiments disclosed herein relate generally to managing communications. More particularly, embodiments disclosed herein relate to managing communications with endpoint devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
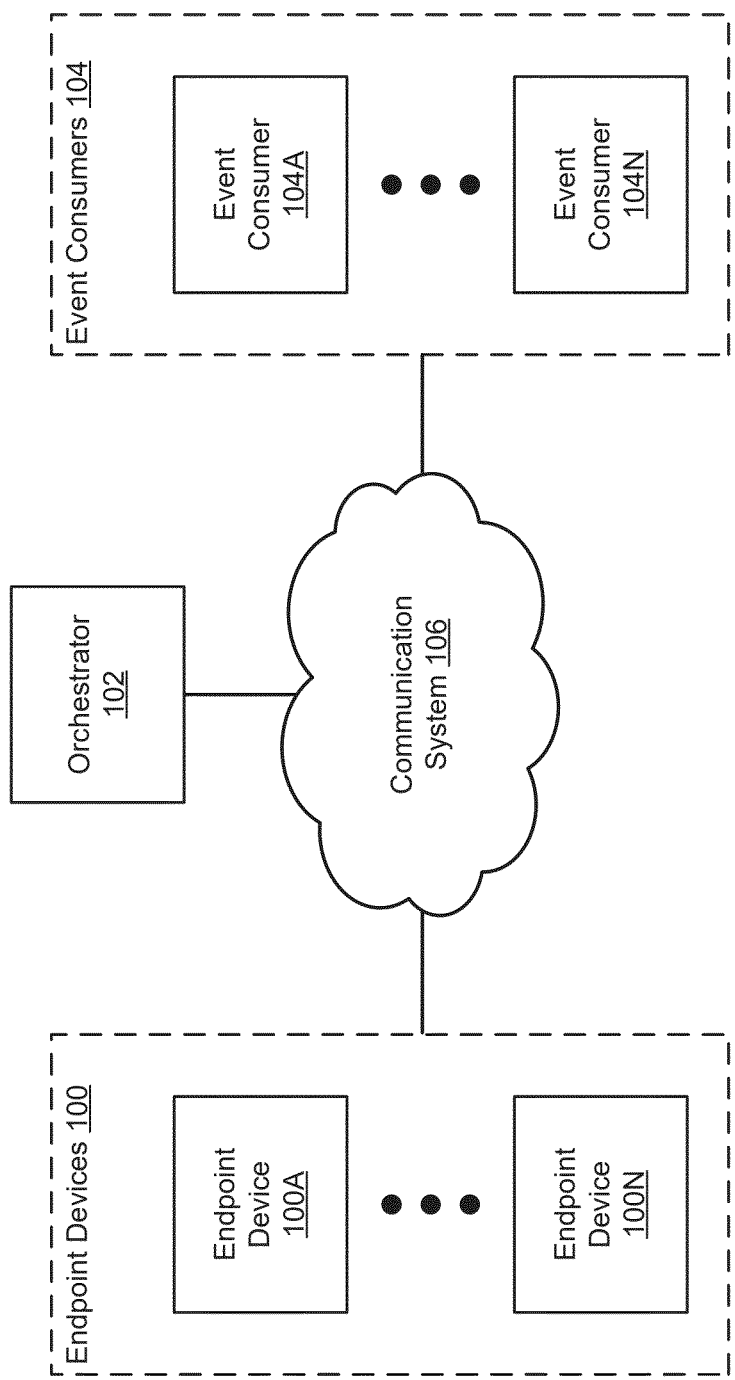
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing communication with endpoint devices in an edge environment. The endpoint devices may collect event data, and the event data may be provided to any number and type of other devices for use in providing various computer-implemented services.

The endpoint devices (e.g., edge devices) may operate in an edge environment. For example, any number and type of endpoint devices may be deployed to physical locations for collecting event data relevant to events (e.g., a change in state detected by an endpoint device) that may occur at the corresponding physical locations. The event data may be requested and used by event consumers to make decisions based on the event data.

However, the event data provided by the endpoint devices may be susceptible to manipulation by malicious entities. For example, event data generated by an endpoint device configured to monitor an operational status of a machine may be manipulated to falsely indicate that the machine is in satisfactory condition. The manipulated event data, when used by an event consumer (e.g., a safety engineer), may prevent the event consumer from initiating a service to repair the machine monitored by the endpoint device.

To improve a likelihood that computer-implemented services may be provided by an event consumer in a reliable manner, an orchestrator (e.g., a management system) may manage communication of event data with endpoint devices. To do so, a limited communication channel may be established between the orchestrator and an endpoint device of the endpoint devices, and event data may be verified by the orchestrator. The limited communication channel may prevent the endpoint device from directly communicating with the event consumer.

The orchestrator may obtain event data received from the endpoint device over the limited communication channel. The event data may include a digital signature that may be verified by the orchestrator to identify whether the event data may have been received from the endpoint device without manipulation by another entity. If the event data is identified to be reliable, the event data may be provided to an event consumer that may use the event data to make decisions based on the event data.

Furthermore, because the orchestrator may obtain event data from any number and type of endpoint devices and a formatting of the event data from each of the endpoint devices may vary, the orchestrator may provide an event schema to the endpoint devices. The event schema may define formatting for the event data when generated by the endpoint devices. By doing so, a processing time by the orchestrator to analyze different event data may be reduced, and subsequently may be provided to an event consumer in a more timely manner.

Thus, embodiments disclosed herein may provide an improved method for managing communication of event data by endpoint devices by utilizing an orchestrator to verify the reliability of the event data and defining an event schema for the event data. By doing so, the event data may be provided to event consumers for use in providing computer-implemented services in a reliable and/or timely manner.

In an embodiment, a method for managing communication with endpoint devices in a deployment is provided. The method may include: (i) obtaining, by an orchestrator of the deployment, event data from an endpoint device of the endpoint devices, the orchestrator being configured to communicate with the endpoint device via a limited communication channel; (ii) identifying, by the orchestrator, whether the event data is reliable; (iii) in a first instance of the identifying where the event data is reliable: (a) selecting an event consumer based on criteria, the criteria indicating a subscription to the event data; and (b) providing the event data to the event consumer for use in providing computer-implemented services.

The method may further include: prior to obtaining the event data from the endpoint device: (i) obtaining, by the orchestrator, an event schema that may define formatting for the event data; and (ii) providing, by the orchestrator and to the endpoint device, instructions to use the event schema to generate the event data.

The formatting may reduce processing required by the orchestrator to analyze event data when compared to processing required to analyze the event data when the event data is generated by event data sources using default formatting, the default formatting varying between different event data sources.

The event schema may include: (i) rules imposed on values of the event data; (ii) a template used to organize a structure of the event data; and (iii) preferences for a collection process of the event data.

The rules imposed on the values of the event data may include: (i) a specified data type for a value of the values; (ii) a unit of measure for the value; and (iii) a range of values that the value may be expected to be within.

The template used to organize the structure of the event data may include: (i) hierarchal relationships between attributes of the event data; (ii) grouping of similar event data based on the attributes; and (iii) naming of the attributes.

The preferences for a collection process of the event data may include a frequency of collections of samples of an event experienced by an event data source that may generate the event data.

The method may further include: prior to obtaining the event data: establishing a set of communication limitations on the endpoint device, the set of communication limitations preventing the endpoint device from communicating with the event consumer.

The event data may be reliable when the event data is received from the endpoint device without manipulation by another entity.

Identifying whether the event data is reliable may include verifying a digital signature of the event data using a public key of a public-private key pair.

The digital signature may be cryptographically generated by the endpoint device using a private key of the public-private key pair.

The event consumer may be subscribed to receive notifications from the orchestrator regarding new event data when new event data is verified by the orchestrator.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer-implemented services (e.g., to user of the system and/or devices operably connected to the system). The computer-implemented services may include, for example, data storage service, instant messaging services, etc.

To provide the computer-implemented services, the system may include endpoint devices 100, orchestrator 102, and event consumers 104. The computer-implemented services may be provided by one or more components of the system of FIG. 1. For example, an event consumer (e.g., 104A) of event consumers 104 may provide at least a portion of the computer-implemented services using data obtained, at least indirectly, from any number of endpoint devices (e.g., 100A, 100B, etc.) of endpoint devices 100.

Endpoint devices 100 may be deployed in an edge environment. The edge environment may include a deployment of any number or type of endpoint devices. Each of the endpoint devices (e.g., edge devices) may operate at a different physical location to collect data relevant to events (e.g., changes in states) experienced by an endpoint device at the corresponding physical location. The endpoint devices may operate independently and/or cooperatively to collect event data.

Because an endpoint device may include limited computing resources (e.g., hardware resources, security protocols, processing abilities, etc.), orchestrator 102 may manage operation of endpoint devices.

For example, consider a scenario in which different endpoint devices (e.g., data processing systems that may monitor operational statuses of different machines on a factory floor). Each endpoint device may monitor and collect event data when an event is experienced by the endpoint device regarding a change in a status of a machine (e.g., temperature, pressure, vibration, etc.). The event data generated by the endpoint devices may be communicated, while connected to a network (e.g., an edge network), to the orchestrator, and/or consumers of the event data.

However, the event data communicated by the endpoint devices may be susceptible to manipulation (e.g., by malicious entities). Because the endpoint devices may operate in different physical locations (e.g., at an edge of the network), each endpoint device may provide an attack surface that may be used by a malicious entity to manipulate event data generated by the endpoint device. For example, event data generated by an endpoint device configured to monitor an operational status of a machine may be manipulated to falsely indicate that the machine is in satisfactory condition. The manipulated event data, when used by an event consumer (e.g., a safety engineer), may prevent the event consumer from providing subsequent computer-implemented services (e.g., initiating a service to repair the machine monitored by the endpoint device).

Furthermore, because the orchestrator may obtain event data from any number and type of endpoint devices, formatting of the event data obtained from each of the endpoint devices may vary. To analyze the event data with various formatting, the orchestrator may process (e.g., normalize) the event data to determine a content of information provided by the event data and/or select an event consumer to provide the event data. By doing so, a distribution of the event data to an event consumer may be delayed. Therefore, impacts of communication of unreliable and/or nonuniform event data may negatively impact a quality of computer-implemented services provided by the system.

In general, embodiments disclosed herein may provide methods, systems, and/or devices for managing communication of event data by endpoint devices in a deployment. To manage communication of event data by endpoint devices, a limited communication channel may be utilized by an orchestrator to provide formatting instructions for the event data generated by the endpoint devices, and to verify a reliability of the received event data before distributing the event data to event consumers. Thus, a likelihood that the event data may be used to inform decisions by event consumers in a reliable and/or timely manner may be increased.

To establish the limited communication channel, communication limitations may be implemented (e.g., via a whitelist and/or a blacklist of network addressable endpoints) by an orchestrator (e.g., a management system) on an endpoint device of the endpoint devices. The communication limitations may prevent the endpoint device from directly communicating with an event consumer. Using the limited communication channel, event data may be transmitted (e.g., as messages) from the endpoint device to an orchestrator.

Prior to obtaining the event data from the endpoint device, the orchestrator may obtain an event schema that may define formatting for the event data and provide instructions to the endpoint device to use the event schema when generating the event data. The event schema may include a uniform formatting schema for event data generated by the endpoint devices. For example, the event schema may include rules imposed on values of the event data, a template used to organize a structure of the event data, preferences for a collection process of the event data, and/or any other formatting instructions. By using the event schema, a formatting of the event data may be uniform and processing time required by the orchestrator to analyze the event data may be reduced.

Additionally, when the event data is obtained by the orchestrator, a reliability of the event data may be identified (e.g., received from the endpoint device without manipulation by another entity). To identify whether the event data is reliable, the orchestrator may verify a digital signature of the event data. The digital signature may be cryptographically generated by the endpoint device using a trusted key (e.g., a public-private key pair) and provided along with each transmission of event data to the orchestrator. For example, the digital signature may be generated by encrypting a hash value using a private key of the public-private key pair. To verify the digital signature, the orchestrator may decrypt the digital signature using a public key of the public-private key pair and compare the decrypted digital signature to a known signature of the endpoint device. By doing so, trust in the event data may be established (e.g., identity of the endpoint device may be verified, the event data has not been altered, etc.).

Once the event data is identified to be reliable, the orchestrator may select any number and type of event consumers to provide the event data. The event consumers may include, for example, other devices (e.g., data processing systems) that may manage operation of the endpoint devices, users of other devices and/or endpoint devices, and/or any other entities that may make decisions based on the event data. The event consumers may be selected by the orchestrator based on criteria regarding subscriptions to the event data. For example, an event consumer may be subscribed to receive event data for certain types of events, from certain sources of the event data (e.g., certain endpoint devices), and/or any other criteria. The event data may then be provided to the selected event consumers for use in providing computer-implemented services (e.g., make decisions and/or trigger actions based on the event data).

To provide the above noted functionality, the system may include endpoint devices 100, orchestrator 102, and event consumers 104. Each of these components is discussed below.

Endpoint devices 100 may include any number of endpoint devices (e.g., 100A-100N) that may be deployed to different physical locations and may be operably connected to each other and/or an orchestrator via a network (e.g., an edge network). Each of endpoint devices 100 may collect event data relevant to events experienced by the endpoint device (e.g., a data processing system) at the corresponding physical location. To do so, an endpoint device (e.g., 100A) of endpoint devices 100 may monitor a state of the endpoint device and generate event data when a change in the state is detected (e.g., an event). For example, endpoint device 100A may include a healthcare device configured to monitor a status of a patient by generating event data regarding heart rate, body temperature, blood pressure, etc. When generated, the event data may be provided to orchestrator 102 via a limited communication channel. The limited communication channel may include, for example, a set of rules (e.g., a whitelist and/or a blacklist of network addressable endpoints) that may be adhered to by each endpoint device of endpoint devices 100 to prevent an endpoint device from directly communicating with an event consumer of event consumers 104.

Figure 2:
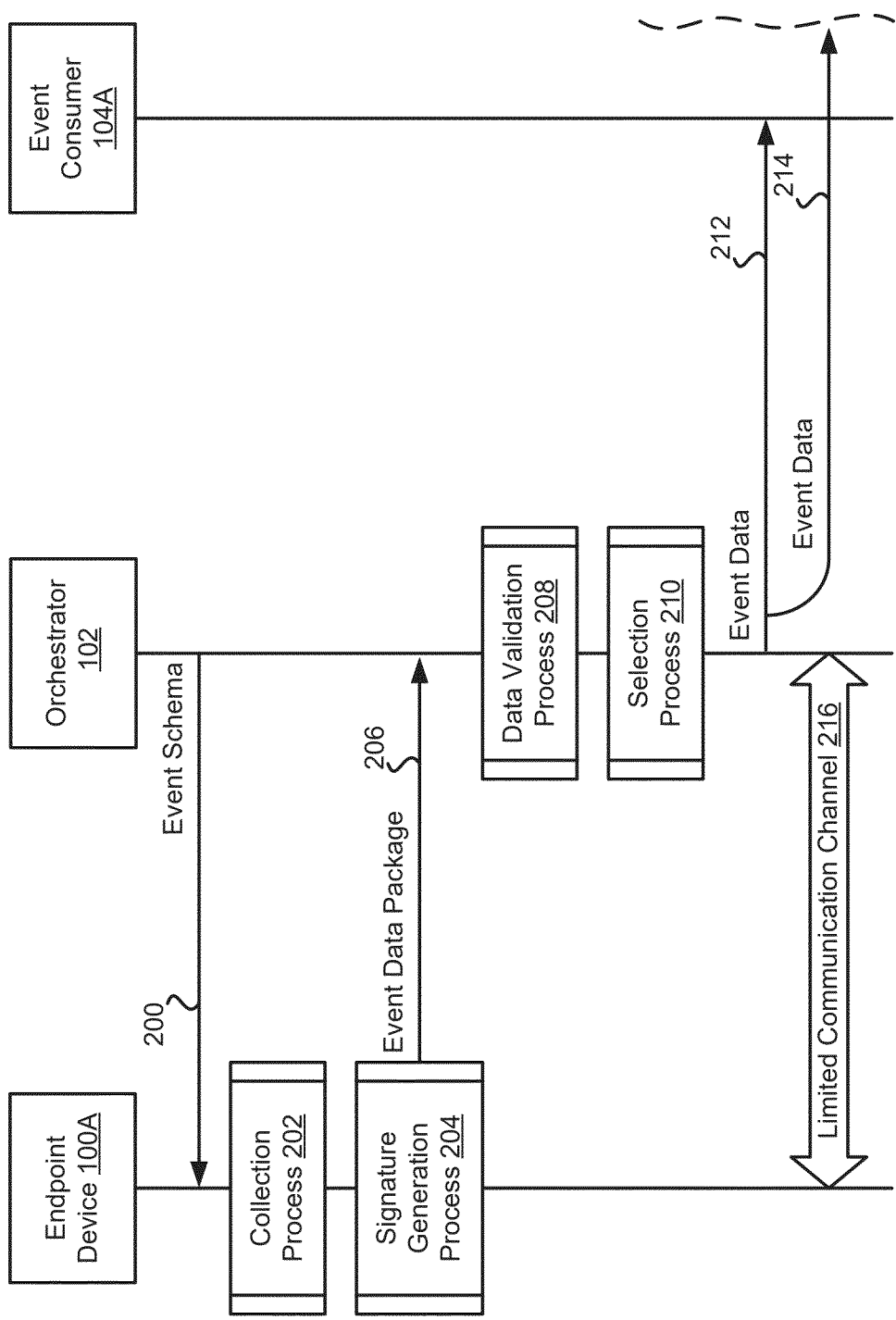
FIG. 2 shows an interaction diagram in accordance with an embodiment.

Orchestrator 102 may, as discussed above, provide event data management services. To provide the event data management services, orchestrator 102 may host hardware and/or software resources to establish a limited communication channel with each of endpoint devices 100 to obtain event data, provide formatting instructions for the event data, verify a reliability of the obtained event data, and distribute the event data to any number of event consumers 104. To establish the limited communication channel, orchestrator 102 may provide instructions to endpoint devices 100 regarding implementation of communication limitations to be adhered to by each of the endpoint devices. When event data is obtained from an endpoint device of endpoint devices 100, orchestrator 102 may verify the reliability of the obtained event data based on a digital signature of the event data and select any number of event consumers of event consumers 104 to distribute the verified event data. Refer to FIG. 2 for additional details regarding event data management services provided by orchestrator 102.

Event consumers 104 may independently and/or cooperatively provide at least a portion of the computer-implemented services using the event data obtained from orchestrator 102. Event consumers 104 may include, for example, other devices (e.g., data processing systems) that may manage operation of the endpoint devices, users of the other devices and/or endpoint devices, and/or any other entities. To provide the computer-implemented services, an event consumer (e.g., 104A) of event consumers 104 may subscribe to receive event data from orchestrator 102 (e.g., based on criteria relevant to a type of computer-implemented service provided by event consumer 104A), analyze the event data, and/or perform an action based on the event data. For example, based on event data obtained that may indicate an increased temperature change experienced by endpoint device 100A, event consumer 104A may perform an action to disable a component of endpoint device 100A, notify an entity tasked with managing operation of endpoint device 100A, and/or perform any other actions.

Figure 3A:
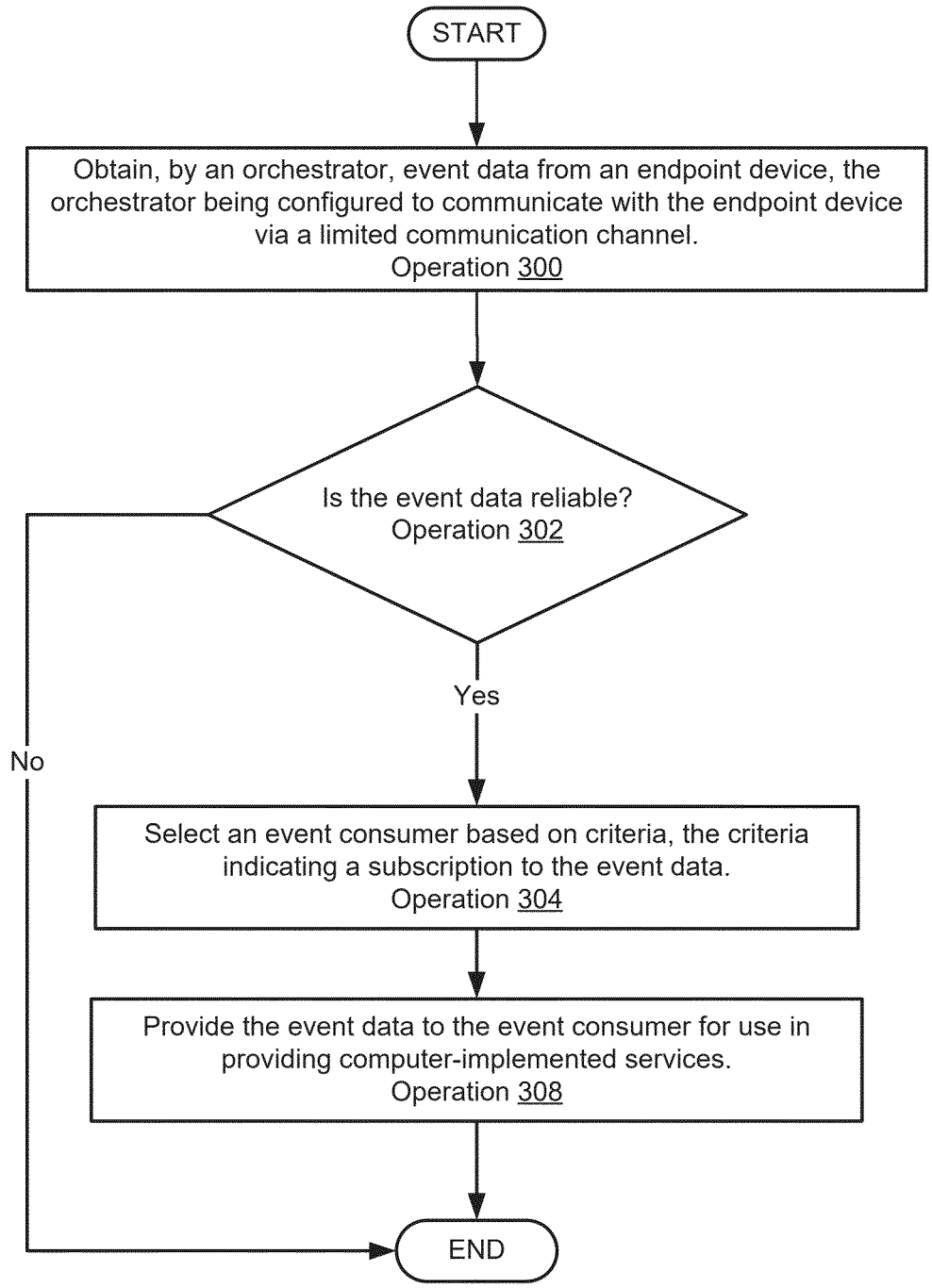
FIG. 3A-3B show flow diagrams illustrating methods in accordance with an embodiment.
Figure 3B:
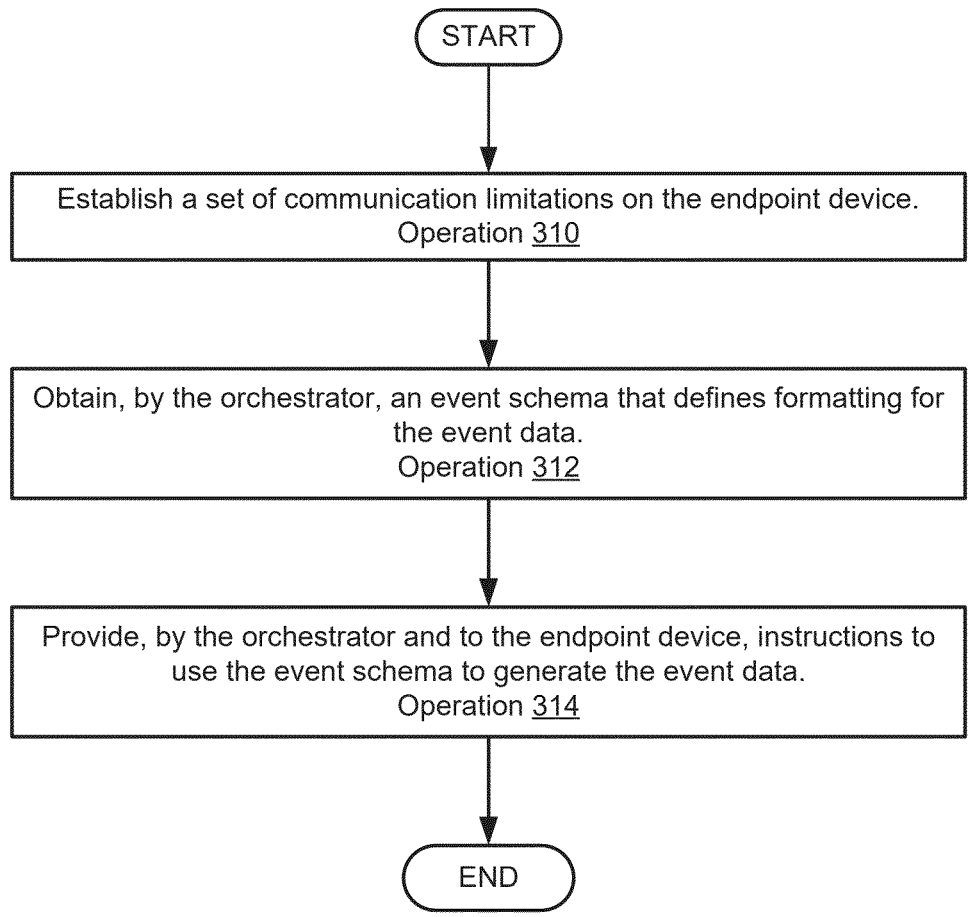

While providing their functionality, any of endpoint devices 100, orchestrator 102, and event consumers 104 may perform all, or a portion, of the interactions and methods shown in FIGS. 2-3B.

Communication system 106 may allow any of endpoint devices 100, orchestrator 102, and event consumers 104 to communicate with one another (and/or with other devices not illustrated in FIG. 1). To provide its functionality, communication system 106 may be implemented with one or more wired and/or wireless networks. Any of these networks may be a private network (e.g., the "Network" shown in FIG. 4), a public network, and/or may include the Internet. For example, endpoint devices may be operably connected to orchestrator 102 via the Internet. Endpoint devices 100, orchestrator 102, and event consumers 104 may be adapted to perform one or more protocols for communicating via communication system 106.

Any of (and/or components thereof) endpoint devices 100, orchestrator 102, and event consumers 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Thus, as shown in FIG. 1, a system in accordance with an embodiment may manage communication of event data between endpoint devices 100 and event consumers 104 by implementing an event schema for the event data and verifying a digital signature provided with the event data. By doing so, a quality and/or timeliness of computer-implemented services provided by event consumers may be increased.

While illustrated in FIG. 1 with a limited number of specific components, a system may include additional, fewer, and/or different components without departing from embodiments disclosed herein.

To further clarify embodiments disclosed herein, an interaction diagram in accordance with an embodiment is shown in FIG. 2. The interaction diagram may illustrate how data may be obtained and used within the system of FIG. 1.

In the interaction diagram, processes performed by and interactions between components of a system in accordance with an embodiment are shown. In the diagram, components of the system are illustrated using a first set of shapes (e.g., 100A, 102, etc.), located towards the top of each figure. Lines descend from these shapes. Processes performed by the components of the system are illustrated using a second set of shapes (e.g., 202, 206, etc.) superimposed over these lines. Interactions (e.g., communication, data transmissions, etc.) between the components of the system are illustrated using a third set of shapes (e.g., 200, 204, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the interaction labeled as 204. However, it will be appreciated that the processes and interactions may be performed in different orders, any may be omitted, and other processes or interactions may be performed without departing from embodiments disclosed herein.

Turning to FIG. 2, an interaction diagram in accordance with an embodiment is shown. The interaction diagram may illustrate processes and interactions that may occur during trusted communication of event data that may be formatted based on an event schema.

Endpoint device 100A may be an endpoint device in a deployment of endpoint devices 100 operating in an edge environment. For example, endpoint device 100A may be a device (e.g., a data processing system) deployed to a physical location to monitor events at the physical location. Interactions and/or processes performed by endpoint device 100A in FIG. 2 may similarly be performed by other endpoint devices (e.g., 100B, 100C, etc.).

At interaction 200, an event schema may be provided to endpoint device 100A by orchestrator 102. The event schema may include, for example, (i) rules imposed on values of event data generated by endpoint device 100A, (ii) a template used to organize a structure of the event data, (iii) preferences for a collection process of the event data, and/or any other formatting instructions to be followed when providing event data to orchestrator 102. The rules imposed on values of the event data may include, for example, (i) a specified data type for a value of the values, (ii) a unit of measure for the value (e.g., Celsius for temperature values, milliseconds for time values, etc.), (iii) a range of values that the value is expected to be within, and/or any other rules. The template used to organize the structure of the event data may include, for example, (i) hierarchal relationships between attributes of the event data, (ii) grouping of similar event data based on the attributes, (iii) naming of the attributes, and/or any other formatting structures for the event data. The preferences for the collection process of the event data may include, for example, a preference for a frequency of collections of a sample of an event experienced by an event data source that may generate the event data (e.g., a sensor and/or monitoring tool of the endpoint device).

The event schema may be generated and provided to endpoint device 100A via (i) transmission via a message, (ii) a publish-subscribe system where endpoint device 100A subscribes to updates from orchestrator 102 thereby causing a copy of the event schema to be propagated to endpoint device 100A, and/or any other processes. By providing the event schema to endpoint device 100A, endpoint device 100A may generate event data in a format defined by the event schema.

To generate the event data, collection process 202 may be performed. During collection process 202, events may be detected, and event data may be generated. To detect the events, endpoint device 100A may monitor a state of endpoint device 100A and/or a state of an entity operably connected to endpoint device 100A. For example, endpoint device 100A may include a cooking appliance in a restaurant, an industrial machine in a factory, a healthcare device connected to a human, and/or any other edge device. When a change in the state of endpoint device 100A is detected, endpoint device 100A may generate event data relevant to the detected change. For example, consider a scenario in which endpoint device 100A may monitor an operational status of a cooking appliance in a restaurant. If the cooking appliance experiences a temperature increase, a decrease in a resource used by the cooking appliance (e.g., water in a water reservoir), a network connection interruption, and/or any other event, endpoint device 100A may generate event data relevant to the event.

To provide an assurance for a reliability of the event data when transmitted, signature generation process 204 may be performed. During signature generation process 204, a digital signature may be generated. For example, to generate the digital signature, endpoint device 100A may encrypt a hash value (e.g., of the event data, a message, etc.) using a private key of a public-private key pair. By providing the generated digital signature, the digital signature may be validated by a receiver of a message signed with the digital signature to increase trust in the message.

At interaction 206, an event data package may be provided to orchestrator 102 by endpoint device 100A. The event data package may include the event data, the digital signature, and/or any other information (e.g., usable to validate the event data). The event data package may be generated and provided to orchestrator 102 via (i) transmission via a message across limited communication channel 216, (ii) a publish-subscribe system where orchestrator 102 subscribes to updates from endpoint device 100A thereby causing a copy of the event data package to be propagated orchestrator 102, and/or any other processes. By providing the event data package to orchestrator 102, orchestrator 102 may validate the event data using the digital signature and distribute the event data to any number of subscribed event consumers.

To identify whether the event data is reliable, data validation process 208 may be performed. During data validation process 208, the digital signature of the event data package may be verified. For example, the digital signature may be verified by: (i) decrypting the digital signature using a public key of the public-private key pair (e.g., used by endpoint device 100A), (ii) comparing a value of the decrypted digital signature with a reference value (e.g., a known signature of endpoint device 100A, a result of a hash function applied on the event data, and/or any other value to indicate data integrity), (iii) performing a digital signature verification algorithm, and/or any other process. By verifying the digital signature, orchestrator 102 may trust that the event data has been received from endpoint device 100A without manipulation by another entity, and that the trusted event data may be distributed to an event consumer.

To identify an event consumer for distribution of the event data, selection process 210 may be performed. During selection process 210, an event consumer may be identified to receive the event data. To identify an event consumer to receive the event data, (i) criteria may be applied on a pool of event consumers, (ii) subscription settings may be obtained that may indicate a desire to receive notifications regarding new event data, (iii) a request (e.g., an application programming interface (API) call) may be obtained from an event consumer, and/or any other methods may be used. By identifying an event consumer, orchestrator 102 may obtain a destination for the event data.

At interaction 212, the event data may be provided to event consumer 104A (e.g., an event consumer identified in selection process 210). Because the event data obtained from endpoint device 100A may be in a format of the event schema (e.g., provided by orchestrator 102 at interaction 200), a processing time required by orchestrator 102 to analyze the event data may be reduced (e.g., when compared to a processing time required to analyze event data that may not be in the format of the event schema). The event data may be provided to event consumer 104A via (i) transmission of a message, (ii) response to an API request, (iii) displaying on an interface used by event consumer 104A, and/or any other process.

At operation 214, the event data may be provided to any number and/or type of additional event consumers (e.g., 104B, 104C, etc.). The additional event consumers may be selected by orchestrator 102 based on criteria and/or subscriptions (e.g., similar to selection process 210), and provided the event data (e.g., similar to actions performed at interaction 212).

Limited communication channel 216 is shown in FIG. 2 to indicate that communication of event data and/or any other information by endpoint device 100A may be subject to limitations configured to prevent endpoint device 100A from communicating with an event consumer (e.g., event consumer 104A). A set of communication limitations may be established on the endpoint device, for example, by implementing (i) a whitelist of entities (e.g., network addressable endpoints of other devices) that endpoint device 100A may have permission to communicate with, (ii) a blacklist of entities (e.g., event consumers) that endpoint device 100A may not have permission to directly communication with, and/or any other methods.

Thus, processes and interactions shown in FIG. 2, event data generated by an endpoint device may be subject to a specified format and communication limitations by an orchestrator. Furthermore, the orchestrator may verify a reliability of the event data using a digital signature provided with the event data by the endpoint device before distributing the event data to an event consumer. By doing so, a quality and/or a timeliness of computer-implemented services provided by the event consumer based on the event data may be improved.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage communication of event data by an endpoint device in a deployment. FIGS. 3A-3B illustrates methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of managing communication by endpoint devices in a deployment in accordance with an embodiment is shown. The method may be performed, for example, by any of the components of the system of FIG. 1, and/or other components not shown therein.

Prior to operation 300, configurations may be established for event data provided by an endpoint device of the endpoint devices. The configurations may be established by: (i) establishing a limited communication channel between the endpoint device and an orchestrator, (ii) obtaining, by the orchestrator, an event schema for the event data generated by the endpoint device, (iii) providing instructions to the endpoint device to use the event schema, and/or any other processes. Refer to FIG. 3B for additional details.

At operation 300, event data may be obtained by the orchestrator from the endpoint device. The event data may be obtained by: (i) receiving a message including the event data and/or any other information (e.g., a digital signature), (ii) reading from a data repository that the endpoint device may update with event data, and/or any other process.

At operation 302, an identification may be made regarding whether the event data is reliable. The identification may be made by: (i) obtaining a digital signature from the endpoint device, (ii) decrypting the digital signature using a public key of a public-private key pair (e.g., provided by the endpoint device), (ii) comparing a value of the decrypted digital signature with a reference value (e.g., a known signature of endpoint device, a result of a hash function applied on the event data, and/or any other value to indicate data integrity), (iii) performing a digital signature verification algorithm, and/or any other process. If the event data is identified to be reliable (e.g., the determination is "Yes" at operation 302), then the method may proceed to operation 304. If the event data is identified to not be reliable (e.g., the determination is "No" at operation 302), then the method may end.

At operation 304, an event consumer may be selected. The event consumer may be selected by: (i) applying criteria on a pool of event consumers, (ii) obtaining subscription settings that may indicate a desire of the event consumer to receive notifications regarding new event data (e.g., of a certain type and/or data source), (iii) obtaining a request (e.g., an API call) an event consumer, and/or any process.

At operation 308, the event data may be provided to the event consumer for use in providing computer-implemented services. The event data may be provided to the event consumer by: (i) transmitting the event data via a message, (ii) storing the event data in a data repository for subsequent retrieval by the event consumer, (iii) displaying the event data on an interface used by the event consumer, and/or any other process.

The method may end following operation 308.

Using the method shown in FIG. 3A, a reliability of event data may be verified by an orchestrator before the event data may be distributed to event consumers. By doing so, a quality of computer-implemented services provided by the event consumers using the event data may be improved.

Turning to FIG. 3B, a second flow diagram illustrating a method of managing communication with endpoint devices in a deployment in accordance with an embodiment is shown. The method may be performed, for example, by any of the components of the system of FIG. 1, and/or other components not shown therein.

At operation 310, a set of communication limitations may be established on the endpoint device. The set of communication limitations may be established by: (i) implementing a whitelist of entities (e.g., network addressable endpoints of other devices) that the endpoint device may have permission to communicate with, (ii) implementing a blacklist of entities (e.g., event consumers) that the endpoint device may not have permission to directly communication with, and/or any other methods to prevent the endpoint device from communicating directly with an event consumer.

At operation 312, an event schema may be obtained that defines formatting for the event data. The event schema may be obtained by: (i) analyzing a log of historic event data (e.g., to determine commonly experienced events, efficiently processed data, and/or any other metric), (ii) obtaining a request from a user of the orchestrator, (iii) creating a template for the format (e.g., an extensible markup language file), and/or any other process.

At operation 314, instructions to use the event schema may be provided to the endpoint device. The instructions may be provided by: (i) transmitting a message (e.g., including information regarding the event schema) to the endpoint device, (ii) configuring hardware and/or software settings on the endpoint data, (iii) storing the event schema in a data repository for subsequent retrieval by the endpoint device, and/or any other process.

The method may end following operation 314.

Using the method shown in FIG. 3B, formatting of event data provided to the orchestrator may be uniform and communication of the event data by the endpoint device may be limited. By doing so, a quality of data management services provided by the orchestrator may be improved.

Figure 4:
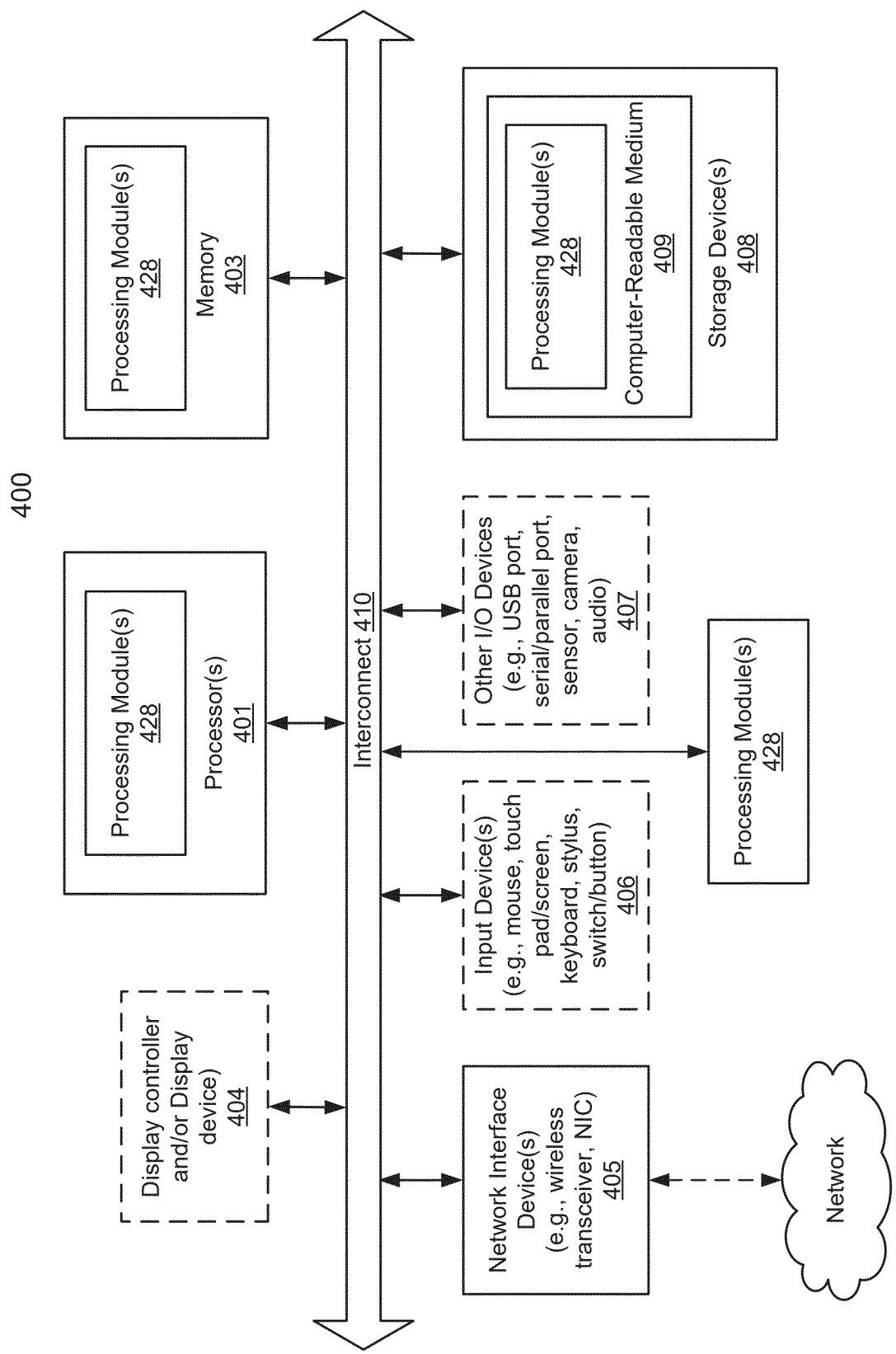
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing communication with endpoint devices in a deployment, the method comprising:
    obtaining, by an orchestrator of the deployment, event data from an endpoint device of the endpoint devices, the orchestrator being configured to communicate with the endpoint device via a limited communication channel;
    identifying, by the orchestrator, whether the event data is reliable;
    in a first instance of the identifying where the event data is reliable:
        selecting an event consumer based on criteria, the criteria indicating a subscription to the event data; and
        providing the event data to the event consumer for use in providing computer-implemented services.

2. The method of claim 1, further comprising:
    prior to obtaining the event data from the endpoint device:
        obtaining, by the orchestrator, an event schema that defines formatting for the event data; and
        providing, by the orchestrator and to the endpoint device, instructions to use the event schema to generate the event data.

3. The method of claim 2, wherein the formatting reduces processing required by the orchestrator to analyze event data when compared to processing required to analyze the event data when the event data is generated by event data sources using default formatting, the default formatting varying between different event data sources.

4. The method of claim 2, wherein the event schema comprises:
    rules imposed on values of the event data;
    a template used to organize a structure of the event data; and
    preferences for a collection process of the event data.

5. The method of claim 4, wherein rules imposed on the values of the event data comprise:
    a specified data type for a value of the values;
    a unit of measure for the value; and
    a range of values that the value is expected to be within.

6. The method of claim 4, where the template used to organize the structure of the event data comprises:
    hierarchal relationships between attributes of the event data;
    grouping of similar event data based on the attributes; and
    naming of the attributes.

7. The method of claim 4, wherein the preferences for a collection process of the event data comprise a frequency of collections of samples of an event experienced by an event data source that generates the event data.

8. The method of claim 1, further comprising:

prior to obtaining the event data:

establishing a set of communication limitations on the endpoint device, the set of communication limitations preventing the endpoint device from communicating with the event consumer.

9. The method of claim 1, wherein the event data is reliable when the event data is received from the endpoint device without manipulation by another entity.

10. The method of claim 1, wherein identifying whether the event data is reliable comprises verifying a digital signature of the event data using a public key of a public-private key pair.

11. The method of claim 10, wherein the digital signature is cryptographically generated by the endpoint device using a private key of the public-private key pair.

12. The method of claim 1, wherein the event consumer is subscribed to receive notifications from the orchestrator regarding new event data when new event data is verified by the orchestrator.

13. A non-transitory machine-readable medium having instructions stored therein, which when executed by a processor, cause the processor to perform operations for managing communication with endpoint devices in a deployment, the operations comprising:

obtaining, by an orchestrator of the deployment, event data from an endpoint device of the endpoint devices, the orchestrator being configured to communicate with the endpoint device via a limited communication channel;

identifying, by the orchestrator, whether the event data is reliable;

in a first instance of the identifying where the event data is reliable:

selecting an event consumer based on criteria, the criteria indicating a subscription to the event data; and providing the event data to the event consumer for use in providing computer-implemented services.

14. The non-transitory machine-readable medium of claim 13, wherein the operations further comprise:

prior to obtaining the event data from the endpoint device:

obtaining, by the orchestrator, an event schema that defines formatting for the event data; and providing, by the orchestrator and to the endpoint device, instructions to use the event schema to generate the event data.

15. The non-transitory machine-readable medium of claim 14, wherein the formatting reduces processing required by the orchestrator to analyze event data when compared to processing required to analyze the event data when the event data is generated by event data sources using default formatting, the default formatting varying between different event data sources.

16. The non-transitory machine-readable medium of claim 14, wherein the event schema comprises:

rules imposed on values of the event data;

a template used to organize a structure of the event data; and preferences for a collection process of the event data.

17. A data processing system, comprising:

a processor;

and a memory coupled to the processor to store instructions, which when executed by the processor, cause the processor to perform operations for managing communication with endpoint devices in a deployment, the operations comprising:

obtaining, by an orchestrator of the deployment, event data from an endpoint device of the endpoint devices, the orchestrator being configured to communicate with the endpoint device via a limited communication channel;

identifying, by the orchestrator, whether the event data is reliable;

in a first instance of the identifying where the event data is reliable:

selecting an event consumer based on criteria, the criteria indicating a subscription to the event data; and providing the event data to the event consumer for use in providing computer-implemented services.

18. The data processing system of claim 17, wherein the operations further comprise:

prior to obtaining the event data from the endpoint device:

obtaining, by the orchestrator, an event schema that defines formatting for the event data; and providing, by the orchestrator and to the endpoint device, instructions to use the event schema to generate the event data.

19. The data processing system of claim 18, wherein the formatting reduces processing required by the orchestrator to analyze event data when compared to processing required to analyze the event data when the event data is generated by event data sources using default formatting, the default formatting varying between different event data sources.

20. The data processing system of claim 18, wherein the event schema comprises:

rules imposed on values of the event data;

a template used to organize a structure of the event data; and preferences for a collection process of the event data.

* * * * *